Sept. 23, 1969   D. R. REACHERT   3,468,354
FOOD-EXTRUDING MACHINE
Filed Feb. 21, 1967   3 Sheets-Sheet 1
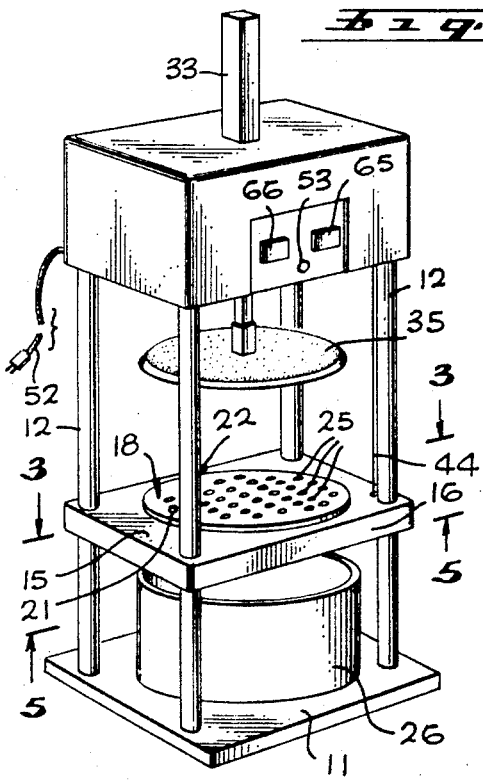
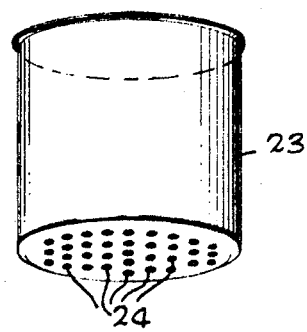
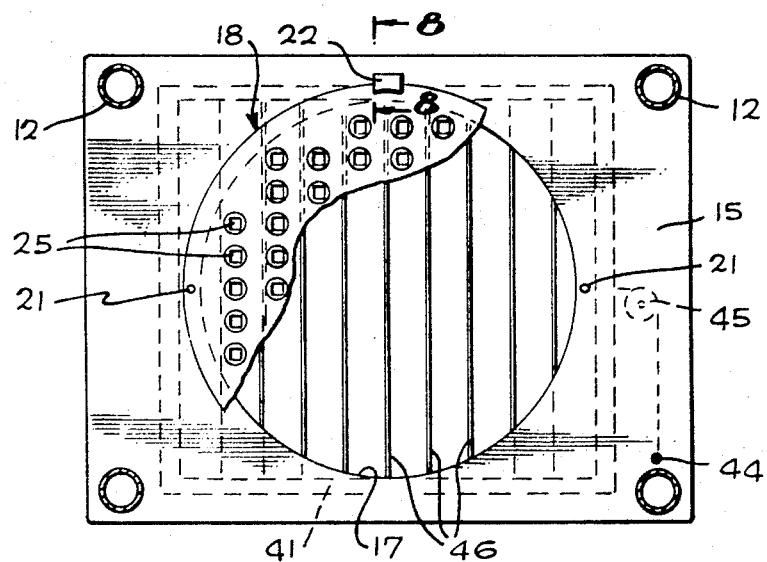
INVENTOR.
DONALD R. REACHERT
BY
ATTORNEY

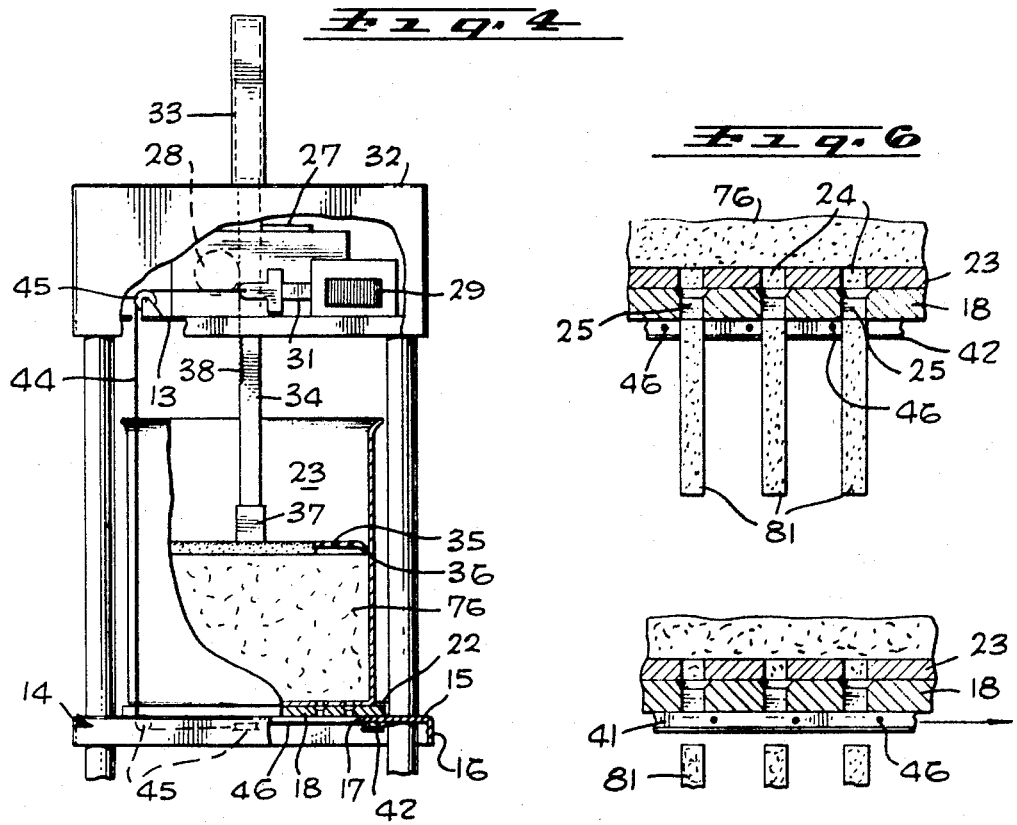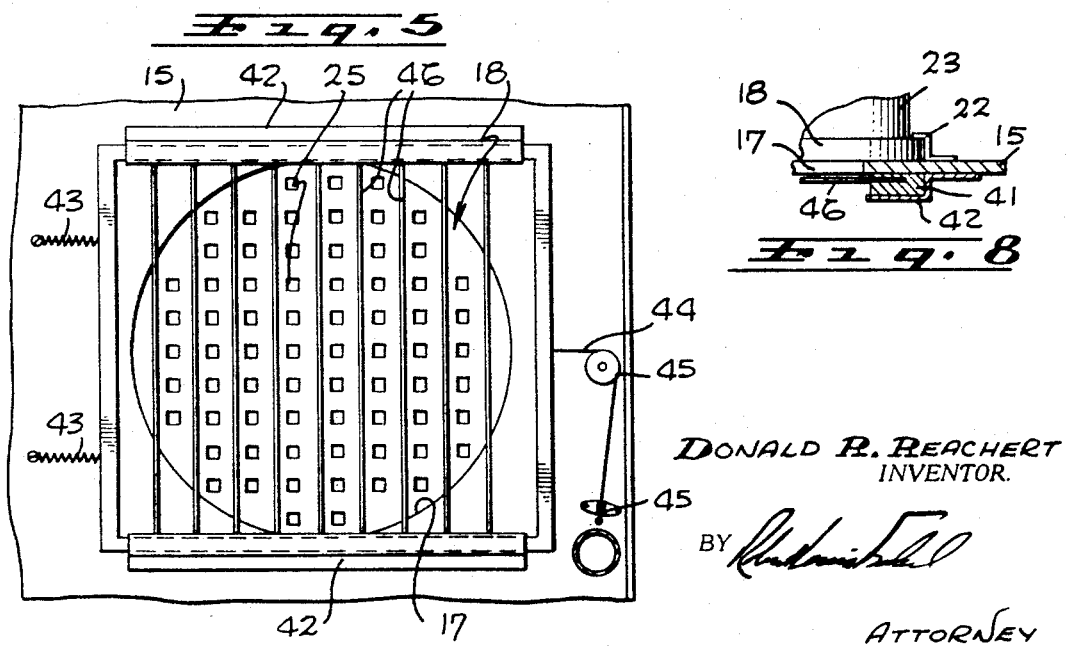

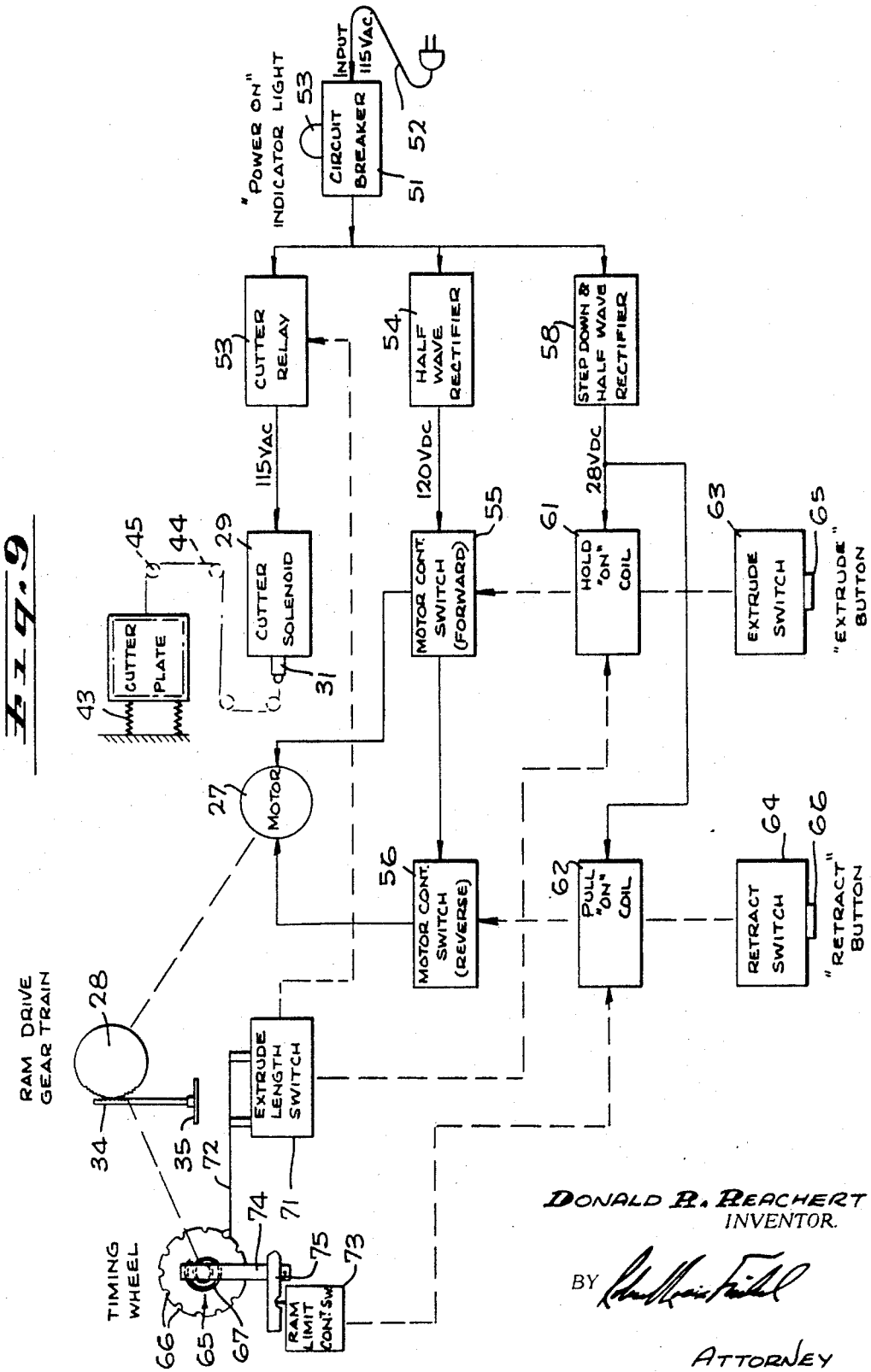

United States Patent Office 3,468,354
Patented Sept. 23, 1969

3,468,354
FOOD-EXTRUDING MACHINE
Donald R. Reachert, 227 S. Turner,
Fullerton, Calif. 92633
Filed Feb. 21, 1967, Ser. No. 617,520
Int. Cl. A01f 29/00, 35/22; A01d 55/02
U.S. Cl. 146—78   5 Claims

ABSTRACT OF THE DISCLOSURE

A reversible motor is connected through a drive train to advance a ram-mounted piston within a smooth walled container having a plurality of openings in one of its ends. The container is seated on an extrusion plate provided with a plurality of shaped orifices registering with the openings in the end of the container. Switch means start and stop the motor, thereby determining the duration of each extrusion sequence and, thus, the length of the extruded elements. A cutter mounted below the extrusion plate is adapted to severe the extruded elements when its actuating mechanism is activated by the motor stop switch. A motor reversing switch is actuated by a ram limit control to withdraw the piston from the container at the completion of the extrusion cycle.

SUMMARY OF THE INVENTION

In its prefered form the invention comprises a reversible motor driven ram operated piston type machine for extruding food in elements of predetermined cross-section, having motor starting and stopping means for selectively determining the length of the extruded elements, cutting means for severing said elements into segments of such length, and motor reversing means for withdrawing the piston upon completion of the extrusion cycle.

The principal object of the invention is to provide a compact, inexpensively constructed, durable, easily maintained substantially automated extruding machine suitable for processing foods such as potato or fish meal or the like for quick-frying. Other objects will become apparent upon reading the following disclosure and examining the drawings to which it refers, in which:

FIGURE 1 is a front perspective view of a preferred embodiment of the invention, with the food container removed to reveal the extrusion plate;

FIGURE 2 is a perspective view showing the underside of the food container;

FIGURE 3 is a top vertical view taken in the direction 3—3 of FIGURE 1 with a portion of the extrusion plate cut away to show the position and construction of the cutter bars;

FIGURE 4 is a partial elevational view of the upper portion of the machine illustrated in FIGURE 1 with parts of the structure cut away to show its internal construction;

FIGURE 5 is a bottom view taken in the direction 5—5 of FIGURE 1 showing the construction of the underside of the base plate and cutter mechanism;

FIGURE 6 is a fragmentary side view of the bottom of the food container, the extrusion plate and the cutter, illustrating one step in the extrusion process;

FIGURE 7 is a fragmentary side view similar to that of FIGURE 6, illustrating the cutting operation;

FIGURE 8 is a fragmentary side detail view taken in the direction 8—8 of FIGURE 3; and FIGURE 9 is a block diagram showing the control circuitry of the illustrated device.

DISCLOSURE

Referring now to FIGURES 1–4, the illustrated extruding machine comprises a stand 11, supporting four sturdy upstanding legs 12, which in turn support an upper deck 13 and an intermediately positioned base 14. Stand 11 is preferably weighted to lower the center of gravity and insure stability. To enhance its appearance, base 14 is constructed with a base plate 15 having a downwardly depending apron 16 around its periphery.

Base plate 15 is provided with a large centrally located circular opening 17. A rigid extrusion plate 18, slightly larger in diameter than opening 17, is seated on base plate 15 and covers opening 17. Holes may be provided in extrusion plate 18 to received locator pins 21; and a clip 22 may be spot welded or similarly attached to the upper side of base plate 15 to secure extrusion plate 18. Locator pins 21 and the curved toe of clip 22 serve to position container 23 on extrusion plate 18.

Container 23 is provided with a plurality of openings 24 in its bottom registering with orifices 25 in extrusion plate 18. The orifices 25 taper downwardly from their circular upper ends to any desired cross-sectional configuration at their lower ends to impart a charecteristic shape to the extruded material.

A receiver 26 is positioned on stand 11 to receive the extruded material.

Deck 13 furnishes support for a reversible electric motor 27, ram drive gear train 28, ram supporting structure (not shown), cutter actuating solenoid 29 and core 31, and the electrical control circuitry illustrated in FIGURE 9 (likewise not shown). A cover 32 and ram housing 33 fit over deck 13 to enclose the entire mechanism.

A rigid ram 34 is supported vertically for reciprocating motion through an opening in deck 13.

Piston 35 is sized to fit snugly within container 23, and is preferably formed with a down-turned edge 36 adapted to form a loose seal with the inner wall of container 23. A hollow boss 37 is secured at the center of the upper side of piston 35 and adapted to receive the lower end of ram 34. Ball detents or similar devices may be provided to secure piston 35 to the end of ram 34.

Teeth 38 are provided along one side of ram 34 and cooperate with the terminal gear in ram drive gear train 28.

FIGURES 4–8 illustrate the cutting mechanism and its operation. The cutting mechanism itself comprises a rectangular cutter frame 41 supported for reciprocating motion by means of cutter guides 42 secured to the underside of base plate 15. Draw springs 43 are connected at one of their ends to the underside of base plate 15 and at their other ends to one end of cutter frame 41. Cable 44 is attached at one of its ends to the end of cutter frame 41 opposite springs 43 and at its other end to core 31 of solenoid 29 mounted on deck 13. Springs 43 and pulleys 45 maintain tension in cable 44. A plurality of rigid or semi-rigid cutter bars 46, preferably in the form of fine gauge wire or rod under tension are supported between the opposite sides of cutter frame 41.

FIGURE 9 illustrates in diagrammatic form the electrical circuitry and control system of the preferred embodiment of the invention. For descriptive purposes the electrical circuitry is designated by solid interconnecting lines, and the control mechanism, which may be electrical, mechanical or both, by broken interconnecting lines. It is to be understood that the electrical and electromechanical techniques presently in common use and well within the state of the art may be substituted, as desired, to accomplish the required results.

Electrical input in the form of standard 115 v. alternating house current is carried to circuit breaker 51 by a conventional electrical cord 52. A "Power On" indicator light 53 may be provided on a display panel to indicate that the machine is in operating condition. Current from circuit breaker 51 is directed through cutter relay 53 to cutter solenoid 29. Half wave rectifier 54 converts the alternating current from circuit breaker 51 to 120 v. direct current which is fed through forward motor control switch 55 and reverse motor control switch 56 and thence to reversible motor 27. Step down half wave rectifier 58 connected to circuit breaker 51 provides 28 v. direct current to energize hold "On" coil 61 and pull "On" coil 62.

Extrude switch 63 and retract switch 64 activate forward motor control switch 55 and reverse motor control switch 56, respectively, and may be operated manually by means of "Extrude" and "Retract" buttons 65 and 66, respectively, mounted on the front of cover 32. Extrude switch 63 is also activated by hold "On" coil 61, and "Retract" switch 64 by pull "On" coil 62.

Timing wheel 65 is mounted to be driven by ram drive gear train 28, and is provided with a plurality of detents 66 spaced around its periphery. In addition timing wheel 65 is provided with a helical cam guide, such as groove 67 in one of its faces. Extrude length switch 71 is actuated by the cooperation of switch arm 72 with each of the detents 66; and ram limit control switch 73 is activated by cam follower 74, which cooperates with cam guide 67, and follower arm 75.

The normal sequence of operation of the extrusion machine as illustrated is as follows. Container 23 is filled with an extrusible meal 76, such as hydrated powdered potatoes, and is positioned on extrusion plate 18. The density of meal 76 is such that it will not flow freely through openings 24 in the bottom of container 23.

"Extrude" button 65 is depressed by the operator and actuates forward motor control switch 55, which in turn energizes motor 27. Motor 27 acting through ram drive gear train 28 and ram 34 forces piston 35 into container 23, extruding the meal through orifices 25 in the form of elongated elements 81 as illustrated in FIGURE 6. Simultaneously timing wheel 65 is rotated until extrude length switch 71 is closed by the camming action of one of the detents 66 against arm 72. Extrude length switch 71 releases hold "On" coil 61, which has been holding "Extrude" switch 63 closed, thereby cutting off the current through forward motor control switch 55 to motor 27. Simultaneously extrude length switch 71 closes cutter relay 53, thereby briefly applying current to cutter solenoid 29. Core 31, drawn momentarily into solenoid 29, increases the tension on cable 44, thereby drawing cutter bars 46 across orifices 25 and severing elements 81 as shown in FIGURE 7. The severed elements 81 fall into receiver 26, from which they may be removed for immediate deep frying or storage.

When the current through cutter relay 53 is terminated, cutter solenoid 29 releases core 31 and springs 43 draw cutter frame 41 back into its rest position ready for the next extrusion cycle.

This sequence is repeated until the ram limit control cam follower 74 reaches the end of travel on guide 67 causing ram limit control switch 73 to close. Ram limit control switch 73 activates pull "On" coil 62, causing it to close the "Retract" switch 64 thereby closing reverse motor control switch 56, sending oppositely polarized current to motor 27. Thus energized, motor 27 operating through gear train 28 and ram 34 draws piston 35 out of container 23. Activation of pull "On" coil 62 of course deactivates hold "On" coil 61.

Motor 26 continues to run in reverse until ram limit control cam guide 67 reaches the end of its reverse travel, causing ram limit control switch 73 to open. The opening of ram limit control switch 73 deactivates pull "On" coil 62, thereby opening reverse motor control switch 56 and cutting off current to motor 27. Piston 35 is now fully withdrawn from container 23, and the machine is ready to start a new extrusion sequence.

It should be apparent from the foregoing description that the specific structure of this machine may be modified broadly without departing from the spirit and scope of the subject invention. Thus, for example, it is contemplated that in place of reversible motor 27 and ram drive gear train 28 with their associated switching and motor reversing circuitry, a non-reversible motor and reversible power transmission train utilizing transmission reversing means may be substituted. Also, a system of cam actuating linkages and a cam drive may be substituted for the cable and pulley cutter actuating arrangement shown. The particular embodiment depicted was chosen solely for illustrative purposes, and is not intended to limit the extent of the invention as hereinafter claimed.

I claim:

1. A food extruding machine for extruding food in elements of predetermined cross-section and length comprising:
   an extrusion plate having a plurality of orifices;
   a food container adapted to be mounted on said extrusion plate, and having a plurality of holes in its bottom registering with said orifices;
   a piston adapted for reciprocating movement within said container;
   a reversible motor;
   power transmitting means effectively connecting said motor with said piston, whereby said piston is driven toward the bottom of said container when said motor is operated in one direction and away from said bottom and out of said container when said motor is operated in the reverse direction;
   first switch means energizing said motor to operate in said one direction;
   second switch means actuated by timing means effectively activated by said first switch means, de-energizing said motor when said piston has advanced a predetermined distance in said container; and
   cutting means activated by said second switch means, severing elements of food extruded from said container through said orifices.

2. A food extruding machine as described in claim 1 including:
   third switch means energizing said motor to operate in said reverse direction; and
   fourth switch means de-energizing said motor when said piston has been withdrawn from said container.

3. A food extruding machine as described in claim 1 including limit defining means associated with said third switch means and actuating said third switch means when said piston reaches a predetermined depth in said container.

4. A food extruding machine for extruding food in elements of predetermined cross-section and length comprising:
   an extrusion plate having a plurality of orifices;
   a food container adapted to be mounted on said extrusion plate, and having a plurality of holes in its bottom registering with said orifices;
   a piston adapted for reciprocating movement within said container;
   a reversible motor;
   power transmitting means effectively connecting said motor with said piston, whereby said piston is driven toward the bottom of said container when said motor is operated in one direction and away from said bottom and out of said container when said motor is operated in the reverse direction;
   first switch means energizing said motor to operate in said one direction;
   second switch means de-energizing said motor when said piston has advanced a predetermined distance in said container;
   third switch means energizing said motor to operate in said reverse direction; and fourth switch means de-energizing said motor when said piston has been withdrawn from the said container.

5. A food extruding machine as described in claim 4 including limit defining means associated with said third switch means and actuating said third switch means when said piston reaches a predetermined depth in the said container.

References Cited

UNITED STATES PATENTS 3,057,523  10/1962  Rietz _____ 146—176 X

W. GRAYDON ABERCROMBIE, Primary Examiner

U.S. Cl. X.R.

146—62, 151, 169, 176; 222—16, 80